No. 651,132. Patented June 5, 1900.
G. H. DAVIS.
METHOD OF PRODUCING ACETYLENE GAS.
(Application filed Oct. 12, 1899.)
(No Model.)
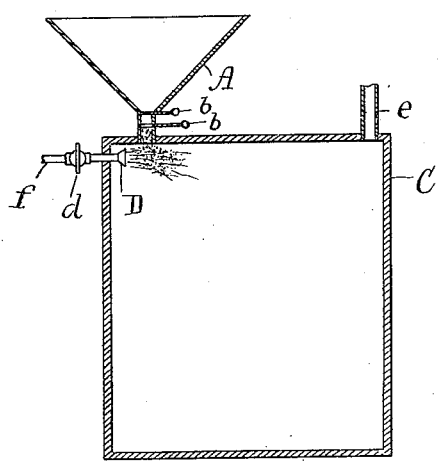
Witnesses:
Inventor:
George H. Davis
by S. W. Bates
his Atty.

United States Patent Office.

GEORGE H. DAVIS, OF PORTLAND, MAINE.

METHOD OF PRODUCING ACETYLENE GAS.

SPECIFICATION forming part of Letters Patent No. 651,132, dated June 5, 1900.

Application filed October 12, 1899. Serial No. 783,352. (No specimens.)

*To all whom it may concern:*

Be it known that I, GEORGE H. DAVIS, a citizen of the United States, residing at Portland, in the county of Cumberland and State of Maine, have invented certain new and useful Improvements in Methods of Producing Acetylene Gas; and I do hereby declare the following to be a full, clear, and exact description of the invention, such as will enable others skilled in the art to which it appertains to make and use the same.

My invention relates to a method for rapidly generating gas, and it relates more particularly to the generation of acetylene gas from calcium carbid for use either in producing light or power. In the generation of this gas it has been common practice to drop water onto a mass of carbid and also to drop carbid in small quantities into water. In both these operations the production of gas was comparatively slow; and it is the object of my invention to form the gas more rapidly and in a small space for use in lighting or for the generation of power in explosion-engines, &c.

The invention consists in bringing together carbid in the form of dust and water in the form of spray or steam both in a finely-divided condition, thus producing almost instantaneous generation of gas.

I illustrate my invention by means of the accompanying drawing, in which I show a vertical section through an apparatus designed to generate gas according to my method.

In the drawing, C represents a generating-chamber, connecting with which is a hopper A, adapted to hold carbid-dust. Means are provided for dropping the carbid-dust into the chamber in small quantities. The simple means here shown by way of illustration consist of two cut-offs $b$ $b$, one over the other. The upper one may be opened, allowing a charge to fill the chamber between them, and then it may be closed, and the lower one may then be opened, allowing the carbid to fall into the generating-chamber. Immediately below the point where the carbid enters the chamber I show a sprinkler-nozzle D, connected with a water-pipe $f$, containing water under pressure. The water is controlled by a valve $d$. A pipe $e$ is shown for conducting away the gas when formed. As the carbid-dust is dropped into the generating-chamber the water is turned on and a spray of water, preferably sufficient in quantity to convert the entire mass of carbid into gas, mingles with the carbid-dust, producing gas almost instantaneously. Instead of water-spray a jet of steam may be used, the essential thing being that both the carbid and the water would be in a finely-divided state, so that the gas is generated instantly.

It is evident that no particular form of apparatus is necessary to carry out this process, as it can be done by manipulation of very simple apparatus.

It is evident that while I have described and claimed the process as being for the production of acetylene gas it may be used to generate any gas formed by uniting a solid and a liquid.

I claim—

1. The herein-described method of generating gas charges consisting of projecting together quantities of carbid and water in a finely-divided state.

2. The herein-described method of generating acetylene gas which consists of dropping a quantity of carbid-dust and immediately projecting into it a water-spray sufficient in quantity to convert the whole quantity of carbid into gas.

3. The herein-described method of generating acetylene gas which consists of dropping a quantity of carbid-dust and projecting a water-spray into it while it is falling.

In testimony whereof I affix my signature in presence of two witnesses.

GEORGE H. DAVIS.

Witnesses:
  S. W. BATES,
  L. M. GODFREY.